Patented May 15, 1923.

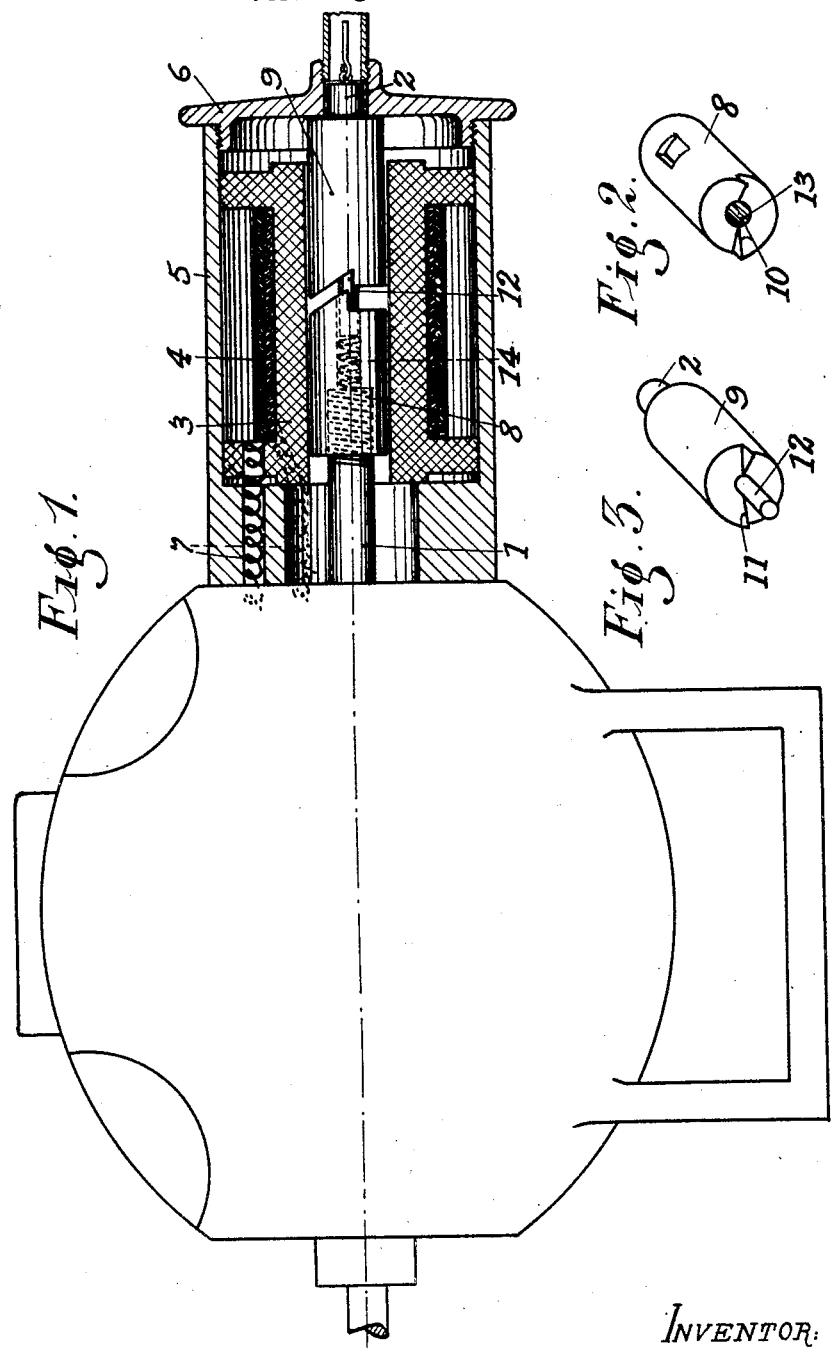

1,455,491

UNITED STATES PATENT OFFICE.

EMILE HUET, OF BRUSSELS, BELGIUM.

ELECTRIC CLUTCH COUPLING FOR USE IN DENTAL TECHNICS.

Application filed August 11, 1921. Serial No. 491,642.

*To all whom it may concern:*

Be it known that I, EMILE HUET, a subject of the King of Belgium, and resident of Brussels, Belgium, have invented certain new and useful Improvements in Electric Clutch Couplings for Use in Dental Technics, of which the following is a specification.

The small electric motors used at present for driving the dental instruments or tools working the teeth preliminary to the setting of artificial teeth, bridgework and the like, turn at a velocity of 7000 and even 10000 revolutions a minute. Now it is necessary, in the dental practice, to stop the rotary tool at any desired instant. A coupling device is therefore applied for connecting the motor shaft with the flexible transmission shaft bearing the tool and this coupling device should be constructed and disposed in such a manner as to enable the transmission shaft to stop when cutting off the electric current, whereas the motor shaft, owing to the inertia of the rotary parts of the motor, proceeds rotating for several revolutions before stopping.

The present invention relates to improvements in such clutch couplings formed of two cylindrical blocks of soft steel disposed in front of each other and forming a clutch, one of same being secured to the free end of the motor shaft and the other to the corresponding end of the flexible transmission shaft, said clutches being inserted and operated in a known manner within the central hollow of a magnetizing coil through which flows a branch current derived from the motor feeding current. It results that, when the current to the motor is cut off by the operator, no current flows through the magnetizing coil and the clutch coupling the shafts is disconnected by an interposed coil spring, whereby both shafts are disconnected from each other.

Now the characteristic feature of the present invention consists in arranging the clutch in such a manner that, when the operator cuts off the current to the motor, the transmission shaft, disconnected from the motor shaft, instantaneously stops, whilst the motor shaft, owing to the inertia of its parts, still accomplishes several revolutions before stopping.

The novel coupling device is shown in the accompanying drawing, in which:

Fig. 1 is an axial section through the whole device;

Fig. 2 is a perspective view of the clutch member or steel block fixed to the motor shaft;

Fig. 3 is a perspective view of the clutch member or block fixed to the flexible transmission shaft.

1 is the motor shaft, 2 is the end of the flexible transmission shaft carrying the tool. 3 is a tubular member provided with flanges upon which is wound a wire 4 forming the magnetizing coil. The ends 7, 7 of wire 4 are connected to the coils of the electric motor and extend through corresponding bores of the sleeve or envelope 5 provided with a threaded flange 6 screwed on a correspondingly threaded end part of envelope 5. The flange 6 is provided with a projecting sleeve within which freely slides to a small amount the end of the flexible transmission shaft.

8 (Fig. 2) shows one of the clutch members provided with a threaded hole (Fig. 1) for being screwed on the correspondingly threaded end of the motor shaft. Clutch member 8 is provided with two sloped parts 10, 10 intended for engaging corresponding parts 11, 11 provided on the contiguous face (Fig. 3) of the clutch member 9 which latter is secured to the end portion 2 of the flexible transmission shaft. In an axial bore of clutch member 9 is secured a short spindle 12 made of copper or brass and projecting from the clutch member. The projecting portion of spindle 12 is slidably engaged in a corresponding axial bore 13 of clutch member 8, whereby both clutch members are positively guided with respect to each other.

Within the bore 13 is engaged a short coil spring 14 which has for its object to instantaneously separate both clutch members 8 and 9 from each other when the current is cut off and to maintain same separated during the time the current is cut off.

The working of the device may be readily understood. When the motor stops and the current is cut off, spring 14 maintains both clutch members 8 and 9 at a small distance from each other; the coupling is disconnected. When electric current is admitted to the motor the motor shaft rotates; simultaneously the branch current flows through the coil 4, the steel blocks 8 and 9 become magnets and the slidable block 9 is attracted towards the fixed block 8, against the action of the small coil spring 14, and the sloped parts or claws 10 and 11 engage each other, whereby the transmission shaft, together with the tool fixed on it, turns in unison with the motor shaft.

When the operator cuts off the current to the motor, no current flows through the magnetizing coil 4, the clutches or steel blocks 8 and 9 are de-energized and pushed apart from each other by the action of coil spring 14, whereby the clutch 9, fixed to the transmission shaft, stops instantaneously, the motor shaft still performing several revolutions.

Having now fully described my said invention, what I claim and desire to secure by Letters Patent, is:

1. An electrically operated clutch coupling for use in connection with electric motors operating dental tools, comprising a magnetizing coil fed by a branch current of the motor feeding current and axially disposed with respect to the motor shaft, and envelope for the magnetizing coil, a flexible transmission shaft, a rigid end portion on the latter shaft projecting through the envelope of the magnetizing coil and slidable within said envelope, a clutch member on the free end of the motor shaft, within the axial hollow of the magnetizing coil, a second clutch member fixed to the rigid end portion of the transmission shaft, in front of the first named shaft, means for axially guiding the slidable clutch member in front of the fixed clutch member and means for automatically and instantaneously disconnecting the clutch members from each other after the electric current to the motor is cut off.

2. An electrically operated clutch coupling for use in connection with electric motors operating dental tools, comprising a magnetizing coil fed by a branch current of the motor feeding current and axially disposed with respect to the motor shaft, an envelope for the magnetizing coil, a flexible transmission shaft, a rigid end portion on the latter shaft projecting through the envelope of the magnetizing coil and slidable within said envelope, a clutch member on the free end of the motor shaft, within the axial hollow of the magnetizing coil, a second clutch member fixed to the rigid end portion of the transmission shaft, in front of the first named shaft, sloped portions on the opposite free face of each of said clutch members, whereby said clutch members engage each other when the electric current passes through the coil, transforming said clutch members into magnets, a short copper spindle on the second named clutch member, a corresponding axial bore in the first named clutch member, within which the said spindle is freely engaged and guided when the corresponding clutch member slides axially and a short coil spring made of copper located within said axial bore for instantaneously pushing both clutch members apart when the current to the motor is cut off.

3. In a dental machine, the combination of an electric motor having a shaft, a flexible shaft having one end connected with a dental tool and the other end in alignment with the motor shaft, a solenoid having an axial bore disposed in axial alignment with the motor shaft and electrically connected with the motor for energization with the motor, a pair of clutch members mounted in the axial bore, one member being rigid on the motor shaft and the other member mounted on the flexible shaft, and means for normally disengaging said members, whereby upon the operation of the motor the solenoid is energized for moving the clutch members into cooperative relation, and said means disengages the members when the solenoid is de-energized.

In testimony whereof I have hereunto set my hand in presence of two witnesses.

EMILE HUET.

Witnesses:
 GEORGES DELBREUCK,
 EMILE VONWOMZELLE.